United States Patent
Jensen

(10) Patent No.: US 8,378,610 B2
(45) Date of Patent: Feb. 19, 2013

(54) LINEAR ACTUATOR

(75) Inventor: Svend Erik Knudsen Jensen, Vejle (DK)

(73) Assignee: Linak A/S, Nordborg (DK)

( * ) Notice: Subject to any disclaimer, the term of this patent is extended or adjusted under 35 U.S.C. 154(b) by 362 days.

(21) Appl. No.: 12/662,709

(22) Filed: Apr. 29, 2010

(65) Prior Publication Data

US 2010/0315031 A1 Dec. 16, 2010

(30) Foreign Application Priority Data

May 1, 2009 (DK) .................................. 2009 00569

(51) Int. Cl.
*H02P 1/04* (2006.01)
(52) U.S. Cl. ...................................................... 318/468
(58) Field of Classification Search .................. None
See application file for complete search history.

(56) References Cited

U.S. PATENT DOCUMENTS

| | | |
|---|---|---|
| 5,809,833 A | 9/1998 | Newport et al. |
| 5,927,144 A | 7/1999 | Koch |
| 7,066,041 B2 | 6/2006 | Nielsen |
| 2003/0090018 A1* | 5/2003 | Bulgrin ........................ 264/40.1 |
| 2008/0114519 A1* | 5/2008 | DuFaux et al. ................ 701/70 |
| 2009/0091287 A1* | 4/2009 | Bastholm ..................... 318/603 |
| 2009/0120220 A1 | 5/2009 | Sorensen et al. |
| 2010/0192713 A1* | 8/2010 | Duits et al. ................... 74/89.23 |
| 2010/0283421 A1* | 11/2010 | Knudsen et al. ............. 318/468 |
| 2010/0315031 A1* | 12/2010 | Jensen ......................... 318/627 |
| 2011/0172541 A1* | 7/2011 | Anthony et al. ............. 600/459 |

FOREIGN PATENT DOCUMENTS

| | | |
|---|---|---|
| DE | 102005035104 | 3/2006 |
| WO | 2005122841 | 12/2005 |

OTHER PUBLICATIONS

English Abstract of DE102005035104.

* cited by examiner

*Primary Examiner* — Mark Budd
(74) *Attorney, Agent, or Firm* — Dykema Gossett PLLC

(57) ABSTRACT

A linear actuator includes a housing with a reversible DC-motor, which through a transmission can displace an activation element between two end positions, where an further switch located in the longitudinal direction of the spindle is activated and deactivated when a spindle nut passes during its travel on the spindle and provides information for a calculation model which continuously calculates the position of the spindle nut on the spindle so that the calculation model in the positions where the further switch is activated by the spindle nut is calibrated to show an absolute position which is entered as a reference point in the control.

21 Claims, 2 Drawing Sheets

LINEAR ACTUATOR

BACKGROUND OF THE INVENTION

1. Field of the Invention

The invention relates to a linear actuator comprising a reversible DC-motor, which through a transmission drives a spindle and thus conveys a linear movement to a spindle nut secured against rotation, where the spindle nut is connected to an activation element which is displaceable between two end positions on the spindle, a power supply for the DC-motor, an electrical control, at least one end stop switch for interrupting the current for the DC-motor in the end position of the activation element or signaling of the end stop position, and a position determination system for determining the position of the spindle nut on the spindle.

2. The Prior Art

For explanation, the invention derives from a linear actuator of the type comprising an activation element, which is axially displaceable in the longitudinal direction of the actuator. A linear actuator comprises an electric motor, which through a transmission drives a spindle. On the spindle there is a spindle nut, to which a tubular activation element is secured with one end. The other end of the activation element is secured by means of a front fixture to the movable element in the structure into which the actuator is incorporated while the actuator with a rear fixture is secured in the stationary part of the structure or vice versa. See WO 02/2984 A1 to Linak A/S. In WO 2005/122841 A1 the spindle nut and the activation element are alternatively designed as one piece which thus appears as a displaceable block on the spindle. When retaining the spindle nut, it will screw itself outwards or inwards on the spindle depending on the direction of rotation, and the activation element will thus be displaced axially outwards or be retracted (WO 96/12123 Koch/Okin).

An absolute determination of the position of the activation element may be carried out by means of a potentiometer, e.g., a rotary potentiometer, which through a gearing is driven by a motor. The location of the glider of the rotary potentiometer will change proportionally to the position of the activation element, and will thus, when the potentiometer is connected to an electrical control, be able to express the position of the activation element (EP 0 831 250 A2 Dana Corp.). A potentiometer in the shape of a sliding potentiometer positioned parallel to the spindle is also known. Here, the spindle nut is typically connected to the glider of the potentiometer (DE 10 2005 035 104 B4 Dewert Antriebs- and Systemtechnik).

Another and more common way to determine the position of the activation element, which due to financial and reliability reasons is preferred in actuators, is by counting the number of rotations of the spindle. The number of rotations multiplied by the thread pitch of the spindle determines the position of the activation element. When the gear ratio is known, the number of rotations of the spindle can be calculated. A method for determining the position of the activation element by counting the rotations is to use incremental sensors like, e.g., a magnetic encoder. A magnetic encoder comprises a magnet ring with a number of poles, which activates a Reed-switch or a Hall-sensor every time one of the poles passes the switch, alternatively the Hall-sensor, at which an electric signal is given (WO 2007/006313 A1 Linak A/S).

Alternatively to a magnetic encoder, an optical encoder may be usedfidi which functions in a similar way, i.e., with a rotating disc with perforations and a light source. When a perforation passes the light source, a beam of light is temporarily let through to a photo cell, which thus gives a signal. Based on the signals the position is calculated by means of a micro processor in the control.

The initiating of an incremental position determination system must be based on a known position of the spindle nut on the spindle, which may be one of the two end positions of the spindle nut's travel on the spindle, indicated by the two end stop switches.

The mentioned systems provide a fine position determination of the spindle nut, but still have limitations and disadvantages.

If a potentiometer is used, this is difficult to incorporate into the actuator as it, depending on whether it is a rotary or sliding potentiometer, must be equipped with an appropriate gearing or rod device, for transferring the movement of the spindle nut to the potentiometer. Further, a potentiometer is mechanically worn, so that it in time becomes unreliable or directly faulty. A potentiometer is further not a cheap component, and even less so when the mechanical connection to the spindle nut is considered.

In order to be able to provide a reliable position determination, an incremental position determination system, e.g., of the magnetic type, requires that the counting device is calibrated to the distance both in respect to the travel compared to rotations, but is also initiated with known positions of the spindle nut on the spindle. If the supply for such a system is interrupted, a new initiation must be performed in order to be able to rely completely on the position determination, as it cannot be known with certainty whether a manual adjustment of the actuator meanwhile has been performed, e.g., by release of a quick-release (WO 2007/006313 Linak A/S). Further, a pulse generator in the shape of a ring magnet must be moved proportionally to the rotation of the spindle, the rotation of the ring magnet is registered by a sensor. This requires that a tap is constructed for the pulse generator, which in order to obtain a more accurate position determination is often equipped with a gearing. An incremental position determination system is thus expensive as it both comprises many mechanical parts, i.e., a tap with a gearing, a pulse generator, at least one sensor, a counting circuit and a calculation device, typically a microprocessor for managing the task.

The purpose of the invention is to provide a solution to the outlined problem, which is both simpler and more inexpensive and further more reliable than the prior art—in particular a solution with a simpler mechanical structure, without expensive components and which is also more reliable over time. Further, a solution is desired which is not as vulnerable to power cuts.

SUMMARY OF THE INVENTION

This is achieved according to the invention by constructing the actuator as stated in claim 1, where the position determination system comprises a calculation model, which includes i) one or more of the physical parameters of the actuator and which as input has ii) dynamic values for absorbed power, where the spindle nut's activation of the end stop switches and at least an further switch iii) gives a signal for calibration of the position of the spindle nut calculated from the calculation model. Thus is achieved that the position of the spindle nut on the spindle is continuously calculated. The deviations which the calculation model may show from the actual position are in a simple manner calibrated out when the spindle nut meets a switch during its travel over the distance of the spindle. This is possible in that the location of the switches, end stop switches or further switches are known by the control.

The switch may expediently be located in a position parallel to the spindle so that it is activated by the spindle nut in at least one position during its travel over the length of the spindle. Thus there are three known positions of the spindle nut on the spindle, the two end stops and the now introduced further switch. The difference between the end stop switches and the further switch is however that the spindle nut at some point during its travel on the spindle meets the further switch and activates this and then after a short movement again releases the switch. In a preferred embodiment, the activation area, where the further switch is activated by the spindle nut, is made longer, at which the switch may indicate two positions of the spindle nut during its travel on the spindle, i.e. the positions where the switch is activated and the position where the switch is deactivated. Depending on the direction of movement of the spindle nut, the two occurrences of the switch will be opposites so that the switch when the spindle nut is moved, in one direction, is first activated and then deactivated, and then when the spindle nut subsequently is moved back, first activates the switch and then deactivates the switch. The signals from the switch should thus be interpreted in respect to position based on the direction of movement of the spindle nut.

The known positions may expediently be represented by a voltage proportional to the travel of the spindle nut on the spindle, which e.g. may be obtained in that the switches are connected to a resistance network, which depending on which switch is closed, constitutes a voltage divider in the same way as when using an analog potentiometer. Thus a simple D/A data converter may be constructed. By incorporating more switches, and adjusting each resistance value to the position, the position of the spindle nut may be more accurately determined.

As it is often the case that a more accurate determination of the position is required for parts of the spindle nut's travel on the spindle, it is expedient to use a microprocessor to calculate the position. The exact position of each switch is thus known, for which reason a table in the program code of the microprocessor may be used for references concerning the position.

It is particularly expedient that the microprocessor has means for calculating the position of the spindle nut when this is in a position between the known positions on the spindle where a switch is activated or deactivated. In order to calculate the position, the microprocessor will have to know the electrical and mechanical parameters of the actuator and the conditions existing during operation—this being operating voltage and power consumption. The parameters of the actuator may be measured during manufacturing of this and be stored in a memory in the microprocessor. In terms of calculation, the motor in the actuator is an ideal motor, without mechanical and electrical loss, indicated by a motor constant and a resistance which is an expression for the loss. Further, the cables connecting the motor to the control will contribution to the loss. If the speed of rotation of the motor, the impressed voltage and the current running into the motor are known, the motor constant and the loss may be calculated. The measurements must be taken during two different loads of the motor, which results in three connected parameters for each measurement, i.e. a speed of rotation of the motor, a terminal voltage and a motor current. The motor constant and the resistance loss may thus be calculated when the measured values are inserted into the formula: (speed of rotation of motor=(motor terminal voltage−motor current*the resistance loss)*motor constant)

The motor speed may at any time be calculated by multiplying the electromotive force by the motor constant. The number of rotations may thus be calculated by incorporating the speed during the time where the motor is connected. The changes to the position of the spindle nut on the spindle may thus be calculated in that the number of rotations of the motor, with respect to the direction of rotation and the gearing between the motor and the spindle, may be converted into the corresponding linear movement of the spindle nut on the spindle.

This is a change of position which is relative to a known position before the position was changed. The known position may as mentioned above be an end stop switch or an further switch located in a position which may be explored by the spindle nut during its travel on the length of the spindle. The exact position of the switch, that being an end stop switch or an further switch, should be determined during the manufacturing of the actuator and accurate information on this position must be stored in a memory, which does not lose its information when the supply is interrupted. Correspondingly, it is expedient if the microprocessor has means for storing the last calculated position in a memory, which does not lose its information when the supply is interrupted. If the calculation of the position is done frequently a more accurate determination of the position is achieved.

There is no doubt that the accuracy of the calculation of the position will be affected by the inertia in the system and introduce an error. In case of many start-ups and stops of the actuator, the error will mount up and result in a deviation from the exact position. A better accuracy is achieved by ensuring that at least one switch is located in the area on the length of the spindle where the spindle nut most frequently moves. The signal, which may be further acted during the activation or deactivation of the switch, can thus be used as input for the control, to calibrate the calculated position indication when the spindle nut is in a known position.

The position determination system according to the invention is especially expedient as it is not affected or is not considerably affected, by the general aging or wear of the actuator. When the actuator is worn the friction in the system is increased and results in a lower efficiency. This will merely act as a larger load which has no impact on the factors in the calculation, i.e. the electromotive force and the motor constant. The fact that an increased intrinsic friction or load does not change the reliability of the position determination appears from the manner in which the electromotive force and the motor constant is calculated, by inserting at least two sets of measured parameters measured with different load on the actuator, where the actuator does not distinguish between inner and outer load. This incorporated ability ensures that the calculated position may be relatively accurate determined even though the load of the actuator may vary.

As it appears the invention provides a solution where the use of expensive sensors is avoided, and with a combination of intelligent calculation and at least one switch located in a fixed known position on the length of the spindle makes it possible quickly to determine the position of the spindle nut on the spindle and moreover in a cheap, reliable and simple manner. It is noted that the microprocessor performing the calculation is already part of the internal electrical system of the actuator, which controls the operation of the actuator. The microprocessor is according to the invention only used to handle one more function, i.e. position determination of the spindle nut on the spindle. The manufacturing of the actuator is further made simpler and cheaper, since mechanical and electrical components such as potentiometers and/or magnetic pulse generators and sensors may be eliminated. When these components are no longer necessary a more reliable product is achieved.

An actuator with the described position determination system may be used as a single actuator in a structure. More actuators may further be used for parallel operation in e.g. an adjustable table or an adjustable bed, as the signals from the position determination in the individual actuator may be processed in a control, which controls the operation of each actuator and ensures that the parallel operation is synchronous.

BRIEF DESCRIPTION OF THE DRAWINGS

A linear actuator according to the invention will be described more fully below with reference to the accompanying drawings, in which.

DETAILED DESCRIPTION OF THE PREFERRED EMBODIMENT

Figure 1:
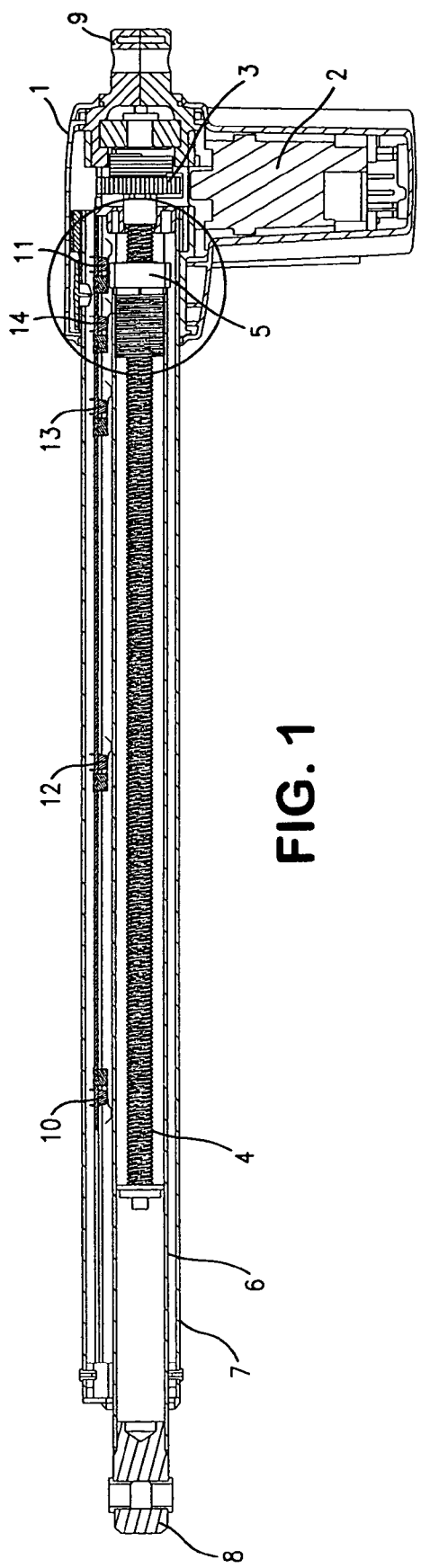
FIG. 1 shows a longitudinal section through a linear actuator.

As it appears from FIG. 1 of the drawing, the main components of the actuator comprises a housing 1 with a reversible DC-motor 2, which through a transmission in the nature of a worm gear 3 drives a spindle 4 on which is arranged a spindle nut 5, to which is secured a tubular activation element 6 (inner tube) surrounded by an outer tube 7. For suspension of the actuator in a structure the actuator is further equipped with a front fixture 8 at the front of the activation element 6 and a rear fixture 9 at the rear end of the housing 1.

Figure 2:
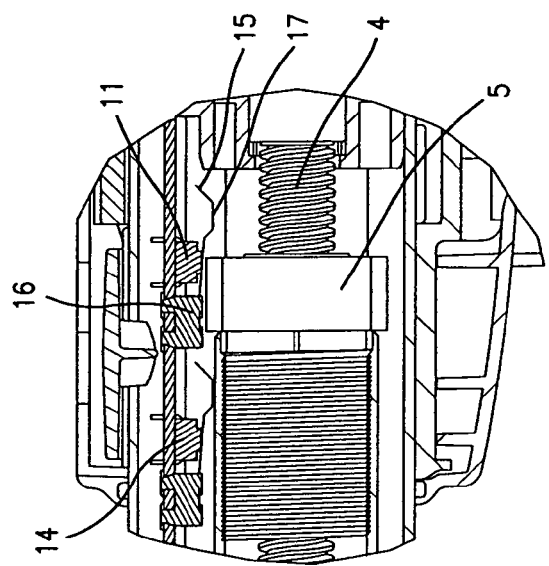
FIG. 2 shows a detailed view of the spindle nut and two switches for determining the position of the spindle nut.

For determining the end positions of the spindle nut and thereby the activation element 6, two end stop switches 10, 11 are arranged in mutual spaced relationship in the actuator along the spindle 5 so that the signals from the switches may be used to calibrate a position determination system for the spindle nut 5. The end stop switches 10,11 are activated by the spindle nut 5 in its desired inner and outer end position. Further switches 12, 13, 14 are arranged between the end stop switches 10,11, as shown, located in known positions along the spindle 4, and may thus indicate the positions to the position determination system. As it appears from FIG. 2, which shows a detailed view of the spindle nut 5, where this is in a position between an end stop switch 11 and the further switch 14 for determining the position of the spindle nut 5 in another known position. The individual switch is activated in that the spindle nut meets a leaf spring 15, which with one end is suspended at a holding device 16 and thus activates the switch 10, 11, 12, 13, 14. The leaf spring 15 is designed with a longitudinal profile, which determines with how much hysteresis the switch is affected. The length of the piece 17 of the leaf spring 15 which is parallel to the spindle 4 thus indicates the two positions when the switch is closed and when it is opened again. Thus two positions are indicated in the longitudinal direction of the spindle 4 at each switch 12,13,14.

Figure 3:
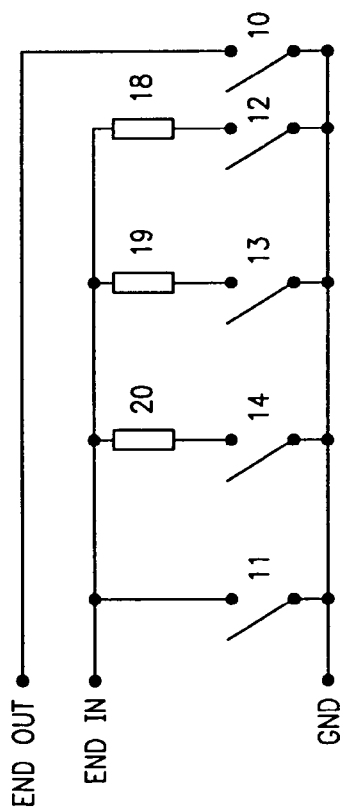
FIG. 3 shows a diagram of the position determination system with the further switches and resistances.
Figure 4:
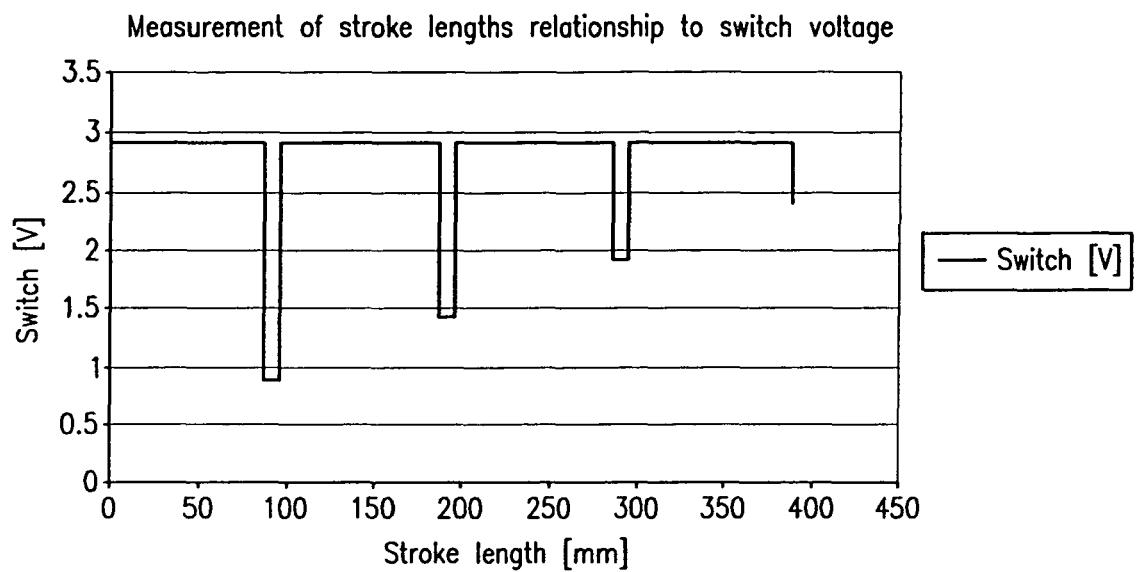
FIG. 4 shows a graphical view of the signals from the switches during a movement of the spindle nut between the two end positions.

As shown in FIG. 3 the end stop and further switches 10, 11, 12, 13, 14 are connected in a network where each switch, with the exception of the end stop switches 10,11, is series-connected with an electric resistance 18, 19, 20. This means that the electric resistance of the network is changed by activating of a switch, so that it is possible to determine when a switch is activated and which switch it is. The resistance values may thus be adapted so that they in a voltage divider provide a voltage which is proportional to the position of the spindle nut 5 on the spindle 4, incidentally in a manner similar as when using a potentiometer for position determination. Alternatively, the position determination system is able to, based on the measured resistance value, to determine the position based on programmed table values incorporated into the software thereof. A curve form of a voltage gradient in relation to the activation and deactivation of the switches due to the travel of the spindle nut 5 on the spindle 4 between the two end stop switches 10,11 is shown in FIG. 4, where it appears that an exact position can only be read in the positions where an end stop switch 10,11 has just been activated or deactivated.

Figure 5:
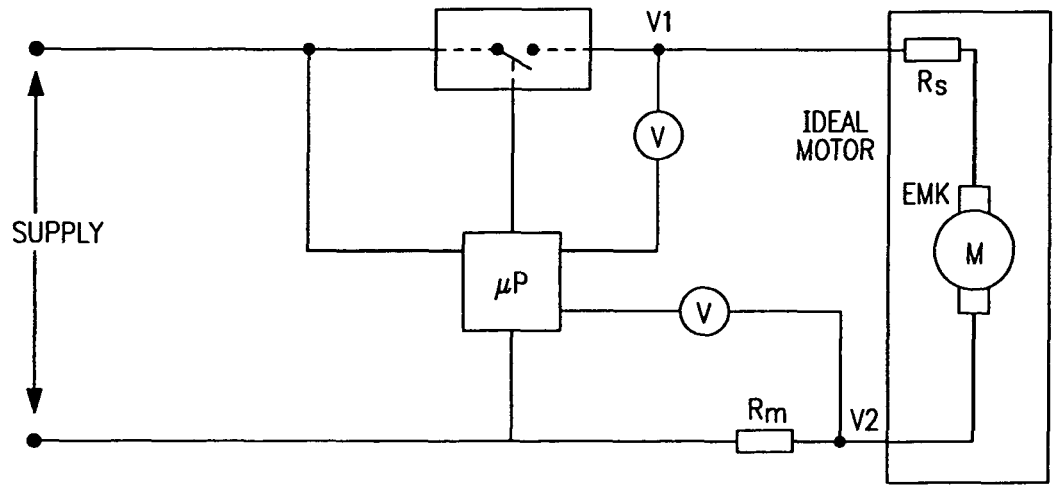
FIG. 5 shows a diagram of the position determination system.

In order to determine the position of the spindle nut 5 when it is not in the activation areas of a switch, the position determination system is equipped with a device which is able to calculate the position based on a mathematical model. FIG. 5 shows a model of an ideal motor equivalent to the motor of the actuator, the ideal motor having an electromotive force EMF and a corresponding resistance loss Rs. The control and speed regulation of the actuator is performed by means of a microprocessor μP, which impresses a pulse-width modulated voltage to the motor 2 of the actuator. The microprocessor is further equipped with a feedback system which measures a set of parameters for the motor in the shape of the impressed terminal voltage V1 and the motor current. The motor current is practically calculated based on the voltage V2 over a small series resistance Rm, incorporated into the electrical circuit.

The mathematical model which includes the ratio of terminal voltage, current collection and rotational speed of the spindle is calculated based on the formula:

Spindle speed=(motor terminal voltage−motor current*Rloss)*motor constant

The speed at which a spindle nut 5 will move on the spindle 4 is proportional to the rotational speed of the spindle and also depends on the pitch of the spindle. If the rotational speed of the spindle 4 is incorporated over time and an expression of the gearing, the pitch between spindle 4 and spindle nut 5 is known, the position of the spindle nut during its travel on the spindle may be calculated at any time.

The model is based on measured parameters for the actuator, where the motor constant and Rloss may be calculated from two sets of measurements, where the numbers are inserted into the mathematic model. Often a set of parameters from a measurement where the actuator is not loaded and a measurement with a load close to the maximum performance of the actuator will be chosen. For explanation of the invention an example of two numbers from two measurements are stated in the following 2 sets of values:

Measurement 1:
Spindle speed 10 mm/sec, 24 V impressed and motor current almost 0
Measurement 2:
Spindle speed 6 mm/sec, 24 V impressed and motor current 4 A If measurement 1 is inserted into the equation:

Spindle speed =

$$\frac{(\text{motor terminal voltage} - \text{motor current} * Rloss) * \text{motor constant}}{}$$

$$10\frac{mm}{sek} = (24\text{ V} - 0 * Rloss) * \text{motor constant}$$

$$\text{Motor constant} = \frac{10\frac{mm}{\text{sec}}}{24\text{ V}}$$

$$\text{Motor constant} = 0,\frac{417\text{ mm}}{\text{sec} * \text{V}}$$

If measurement 2 is inserted into the equation relating to the motor constant calculated above:

$$6 = (24 - 4 * Rloss) * 0.417$$

$$\frac{6}{0.417} = 24 - 4 * Rloss$$

$$Rloss = \frac{(24 - 14.4)}{4}$$

$$Rloss = 2.4$$

In practice it will not be possible to take a no-load measurement without any power consumption. The no-load current is here fixed at zero in order to simplify the explanation. In practice it would be expedient to consider even a very small current in the calculation in order to, in overall terms, achieve a more accurate calculation of the position of the spindle nut, but the method is incidentally the same. Thus it is achieved to calculate a conversion ratio between motor voltage, motor current and rotational speed of the spindle, which may be used in the continuous calculation of the position of the spindle nut. An actuator with a length of stroke of 200 mm, it will, when the actuator is not loaded, take 20 seconds to move the spindle nut over the full length. The integral EMF is thus:

$$EMF = 20[s] * 24[v] = 480[v*s].$$

The position may now at any time be calculated based on an integral EMF. If the loaded actuator is operated for 10 seconds while being loaded to a current of 2 [A], the integral EMF may be calculated:

$$EMF = 10[s] * (24 - 2 * 4)[v] = 198[v*s]$$

which corresponds to a position of the spindle nut of:

$$\text{Position} = EMF * \text{motor constant} = 198[vs] * 0.417\left[\frac{mm}{vs}\right] = 82.5[mm]$$

It thus appears that the model can take into account the effect a load has on the speed of the actuator meaning that the calculation of the position is reliable during all loads of the actuator. Even when the mechanical parts of the actuator are worn and thus create more mechanical friction, the model can be used, as the friction when taken into the calculation will be regarded by the model as a larger mechanical load of the actuator, as the model does not distinguish between inner and outer load.

The position calculation is relative as it is calculated based on a known position and a contribution to the change of position is calculated every millisecond, so that a new and updated position deviation is thus achieved every millisecond. This also means that the variation in the load of the actuator occurring during operation will be included. This particularly applies to conditions during start-up and stop, where the load during e.g. start-up is larger until the actuator has reached full speed. The software manages the position and stores it when the supply voltage is interrupted. To remove possible errors which may mount up, the software calibrates the position every time the spindle nut reaches a known position on the length of the spindle. A known position is as a minimum one of the two end stops, but the use of further switches 12,13,14, located in known positions along the length of the spindle, increases the accuracy of the position indication. It is thus preferred that the further switches are located strategically, so that they during normal operation from time to time are activated by the spindle nut. If a further switch e.g. has an activation point positioned 82 mm in on the length of the spindle and a deactivation point 86 mm in on the length of the spindle, depending on in which direction the spindle nut moves, the software should calibrate the calculated position of the spindle nut with these absolute position indications when it passes the absolute switch points.

The term "microprocessor" used in the description covers any unit, capable of meeting the requirements for data processing performed by the microprocessor mentioned in the description. The mentioned software is portions of program code which in connection with the processing in the microprocessor manages a control and operation function in the control of the actuator.

The invention claimed is:

1. Linear actuator comprising
a reversible DC-motor,
a transmission,
a spindle in driving connection with the DC-motor through the transmission,
a spindle nut arranged on the spindle and secured against rotation, such that it is displaceable between two end stop positions on the spindle, at least one end stop switch for interrupting the current to the DC-motor in the two end positions of the spindle nut or signaling of the end stop position,
a position determination system for determining the position of the spindle nut on the spindle,
wherein the position determination system comprises at least one further switch that could be activated by the spindle nut and a microprocessor containing a calculation model, which calculation model includes i) one or more of the physical parameters of the actuator and which as input has ii) dynamic values for absorbed power, and where the spindle nut's activation of the at least one end stop switch and the at least one further switch iii) gives a signal for calibration of the position of the spindle nut on the spindle calculated from the calculation model.

2. The linear actuator according to claim 1, wherein the activation area, where the spindle nut activates the further switch covers a distance on the length of the spindle.

3. The linear actuator according to claim 1, wherein a new position of the spindle nut is indicated both by activation and deactivation of the further switch.

4. The linear actuator according to claim 3, wherein the position of the spindle nut in connection with the activation and deactivation of the further switch is determined based on the direction of movement of the spindle nut.

5. The linear actuator according to claim 1, wherein the position determination system has means for reading the state of the end stop switches and the further switches.

6. The linear actuator according to claim 1, wherein the position determination system has means for measuring the voltage and current of the DC-motor.

7. The linear actuator according to claim 1, wherein the means for calculating changes of the position of the spindle nut is a calculation model, which includes physical parameters of the actuator which at least comprises the motor constant and the resistance loss, at which the immediate motor speed may be calculated.

8. The linear actuator according to claim 7, wherein the immediate motor speed is calculated by inserting the measured values for the motor voltage and motor current in the calculation model.

9. The linear actuator according to claim 8, wherein the change of the position of the spindle nut is calculated by incorporation of the immediate motor speed over the time where the motor has been activated.

10. The linear actuator according to claim 1, wherein the position determination system is equipped with a memory which continuously is updated with information about the position of the spindle nut on the spindle in that the information is delivered as a contribution or deduction measured over a period of time, which is summed up in the memory and, where the position of the spindle nut when activating or deactivating a switch calibrates the contents in the memory to a predetermined value in the control, which corresponds to the exact position of the spindle nut on the spindle.

11. A method of determining the position of a spindle nut on a spindle of a linear actuator where the spindle is driven by a DC-motor, comprising the steps of:
registering a known position of the spindle nut on the spindle,
calculating the travel of the spindle nut on the spindle from the rotational speed of the spindle and the pitch of the spindle, and
calculating the position of the spindle by the travel of the spindle nut relative to the known position.

12. A method according to claim 11, comprising registering the motor terminal voltage and the motor current, determining the resistance Rloss in the motor and a motor constant, and calculating the rotational speed of the spindle from the formula:

Spindle speed=(motor terminal voltage−motor current*$R$loss)*motor constant.

13. The method according to claim 12, comprising impressing a certain voltage on the motor in an unloaded state of the linear actuator, measuring the rotational speed of the spindle, then calculating the motor constant is on the basis of the formula Spindle speed=(motor terminal voltage−motor current*$R$loss)*motor constant making the assumption that the motor current is zero.

14. The method according to claim 13, comprising loading the spindle nut with a known load, impressing a certain known voltage on the motor, and measuring the motor current, then calculating the electric loss Rloss of the motor on the basis of the formula Spindle speed=(motor terminal voltage−motor current*$R$loss)*motor constant applying the motor constant.

15. The method according to claim 12, comprising calculating the motor current based on the voltage V2 over a small series resistance Rm in series with the motor.

16. The method according to claim 11, comprising recording a certain length of travel of the spindle nut, recording the corresponding time of travel and the voltage impressed on the motor, then calculating the electromotive force on the basis of the formula: EMF=time*motor terminal voltage.

17. The method according to claim 16, comprising calculating the position of the spindle nut at any time on the basis of Position=$EMF$*motor constant.

18. The method according to claim 17, comprising calculating the position of the spindle nut every millisecond based on the known position of the spindle nut on the spindle.

19. The method according to claim 18, comprising storing the position of the spindle nut in a memory.

20. The method according to claim 18, comprising calibrating the position of the spindle nut every time the spindle nut reaches a known position on the spindle.

21. The method according to claim 19, comprising locating known positions, so that the spindle nut during normal operation of the linear actuator from time-to-time pass at least one known position.

* * * * *